United States Patent Office 3,441,516
Patented Apr. 29, 1969

3,441,516
VITREOUS ENAMEL RESISTOR COMPOSITION
AND RESISTOR MADE THEREFROM
William A. Mulligan, Willingboro, N.J., and Remington
M. Murphy, Roslyn, Pa., assignors to TRW, Inc.,
Philadelphia, Pa.
Continuation-in-part of application Ser. No. 254,919,
Jan. 30, 1963. This application Apr. 21, 1966, Ser.
No. 544,128
Int. Cl. H01b 3/08, 1/02; H01c 7/02
U.S. Cl. 252—512    9 Claims

ABSTRACT OF THE DISCLOSURE

A vitreous enamel resistance composition is disclosed comprising a vitreous frit or enamel, particles of an electrically conductive material and kaolin. In general, the invention is in the discovery that the temperature coefficient of resistance of a vitreous enamel resistance material is reduced by the addition of kaolin thereto.

The present invention relates to a resistance material and a resistor made therefrom. More particularly, the present invention relates to a vitreous enamel resistance material and a resistor made therefrom. This is a continuation-in-part of our pending application Ser. No. 254,919, filed Jan. 30, 1963, entitled, "Resistance Material and Resistor Made Therefrom," now abandoned.

An electrical resistance material which has recently come into use in the manufacture of electrical resistors is a vitreous enamel resistance material. Such a vitreous enamel resistance material comprises an enamel containing an electrically conductive material. The vitreous enamel resistance material is formed by mixing together a glass frit and finely divided particles of the electrically conductive material. To make a resistor, the resistance material is coated on a ceramic dielectric body and fired to fuse and cure the glass frit.

One problem which has arisen with the vitreous enamel resistance material is with regard to their stability with respect to changes in temperature. When the resistance material is subjected to a change in temperature, the resistance of the material changes. The amount of change of the resistance per degree change in temperature is known as its temperature coefficient of resistance, hereinafter referred to as T.C. A resistance material having a T.C. of zero is the most stable, and therefore the most satisfactory material. However, resistance materials having relatively low T.C.'s, for example, less than 0.02% per degree C., are very satisfactory for making commercially acceptable resistors.

It is an object of the present invention to provide novel electrical materials.

It is another object of the present invention to provide novel vitreous enamel resistance materials.

It is still another object of the present invention to provide vitreous enamel resistance materials having improved temperature coefficient of resistance.

It is a further object of the present invention to provide electrical resistors utilizing vitreous enamel resistance materials having an improved temperature coefficient of resistance.

Other objects will appear hereinafter.

The invention accordingly comprises a composition of matter and the product formed therewith possessing the characteristics, properties and the relation of constituents which will be exemplified in the composition hereafter described, and the scope of the invention will be indicated in the claims.

Figure 1:
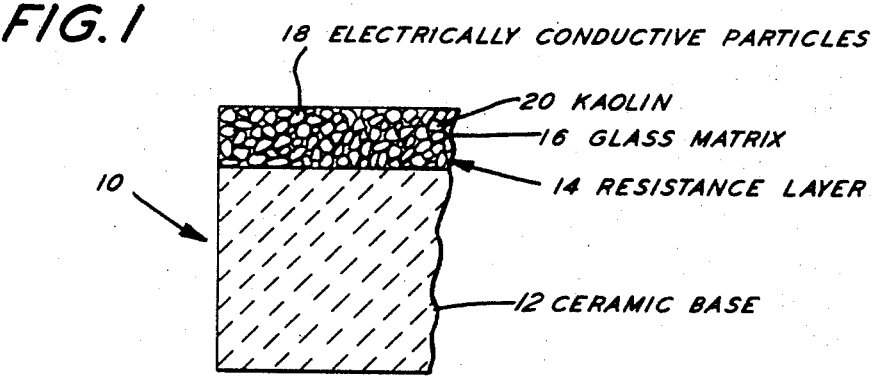

FIGURE 1 of the drawing is a cross-sectional view, on a highly exaggerated scale, of a portion of a resistor produced in accordance with this invention.

Figure 2:
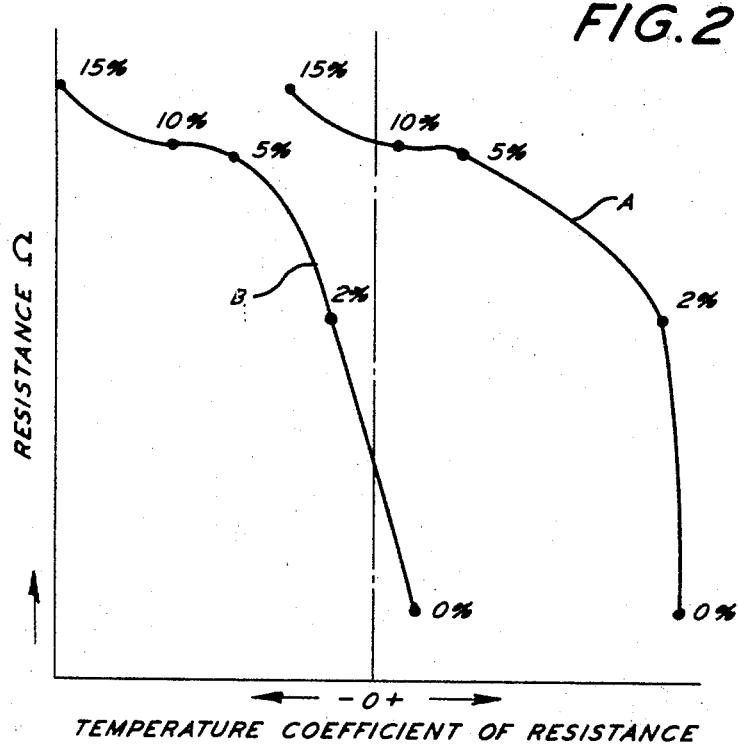

FIGURE 2 of the drawing is a graph showing the variation in the temperature coefficient of resistance of a resistance material of the present invention with variations in the amount of kaolin in the resistance material.

In general, the present invention is in the discovery that the temperature coefficient of resistance of a vitreous enamel resistance material is reduced by the addition of kaolin ($Al_2O_3 \cdot 2SiO_2 \cdot 2H_2O$) to the resistance material. By reducing the T.C. of the vitreous enamel resistance material, it is meant that the T.C. becomes closer to zero. Thus, the addition of kaolin to a vitreous enamel resistance material which normally has a positive T.C. makes the T.C. less positive, and the addition of kaolin to a vitreous enamel resistance material which normally has a negative T.C. makes the T.C. less negative. More particularly, it has been found that the reduction in the T.C. of the resistance material is achieved by the addition of between 2 to 15% by weight of the kaolin. Below 2% kaolin has little or no effect on the T.C. of the resistance material, and more than 15% kaolin can cause certain types of the resistance materials to agglomerate when mixed. The optimum reduction in the T.C. of the resistance material is achieved with approximately 5% kaolin.

More specifically, the vitreous enamel resistance material of the present invention comprises a mixture of a vitreous frit or enamel, finely divided particles of an electrically conductive material, and kaolin. The vitreous frit used in the resistance material may be of any well-known composition which has a melting temperature below that of the conductive material used. The vitreous frits most preferably used are the borosilicate frits, such as lead borosilicate frit, bismuth, cadmium, barium, calcium or other alkaline earth borosilicate frits. The electrically conductive material may be particles of any of the materials which have been found to provide good resistance characteristics in a vitreous enamel resistance material, such as certain metals, metal alloys, mixture of metals, certain metal compounds and mixtures of the metal compounds and metals. Among the metals which can be used, the noble metals have been found to be the most satisfactory and particularly palladium or a mixture or alloy of palladium and silver. A metal compound which can be used is either tungsten carbide or a mixture of tungsten carbide and tungsten as described in the U.S. patent to Remington M. Murphy et al., No. 3,180,841, issued Apr. 27, 1965, entitled "Resistance Material and Resistor Made Therefrom." Another conductive material which has been found to provide good vitreous enamel resistance materials is a mixture of a refractory metal nitride and a refractory metal. The refractory metal nitride can be titanium nitride, zirconium nitride, hafnium nitride, vanadium nitride, niobium nitride, tantalum nitride, chromium nitride, molybdenum nitride or tungsten nitride. The refractory metal can be any of the metals of these nitrides although it is preferable to use the same metal as that of the nitride.

In a resistance material of the present invention in which the electrically conductive material is a noble metal, a noble metal alloy or mixture of noble metals. The preferred ranges of the components of the resistance material are by weight 68% to 30% vitreous frit, 30% to 55% conductive metal particles, and 2% to 15% kaolin. When using a mixture of palladium and silver as the conductive metal, the preferred proportions of the metals are 56% of the total metal content being palladium and 44% being silver. In a resistance material of the present invention in which the electrically conductive material is either tungsten carbide or a mixture of tungsten carbide and tungsten, the preferred ranges of the components of the resistance material are by weight 10% to 75% vitreous frit, 25% to 90% tungsten carbide or a mixture of tungsten carbide and tungsten, and 2% to 15% kaolin. When the electrically conductive material is a mixture of a refractory metal nitride and a refractory metal, the preferred ranges of the components of the resistance material are by volume 50% to 95% vitreous frit, 5% to 50% refractory metal nitride and refractory metal combined, to which is added by weight 2% to 15% kaolin. The ratio of the refractory metal nitride to the refractory metal can be between 0.5 to 5 parts of the refractory metal nitride to 1 part of the refractory metal.

Referring to the drawings, FIGURE 1 shows a resistor, generally designated as 10, formed with the vitreous enamel resistance material of the present invention. Resistor 10 comprises a ceramic base 12 having a layer 14 of the vitreous enamel resistance material coated on a surface thereof. The ceramic base may be composed of any ceramic material which can withstand the firing temperature of the resistance material. For example, the ceramic base may be glass, porcelain, steatite, barium titanate, alumina or the like. The resistance material layer 14 comprises a glass matrix 16 having the particles 18 of the electrically conductive material and the kaolin 20 embedded in and dispersed throughout the glass matrix 16.

Referring to FIGURE 2 of the drawing, there is shown a graph illustrating the typical change in the temperature coefficient of resistance of the resistance material of the present invention with variations in the amount of kaolin in the resistance material. The resistance material illustrated by this graph comprises a mixture of a lead borosilicate glass, palladium, silver, and kaolin. Line A shows the variation in the T.C. of the resistance material when the resistance material is heated from 25° C. to 150° C. Line B shows the variation in the T.C. when the resistance material is cooled from 25° C. to −55° C. As can be seen from this graph, this resistance material without any kaolin has a positive T.C. The addition of only 2% kaolin decreases the T.C. of the material so that the T.C. is less positive. However, the addition of 5% kaolin to the resistance material provides a considerable reduction in the T.C. of the resistance material. Although further increasing the amount of kaolin in the resistance material further reduces the T.C. of the resistance material, the reduction in the T.C. is smaller, and the T.C. becomes more negative on the low temperature side. Thus, it can be seen that 5% kaolin in the resistance material provides the optimum T.C. both on the low and high temperature sides. For this resistance material composition, the addition of over 15% kaolin to the resistance material causes the material to agglomerate when mixed.

ture coefficient of resistance. Thus, it can be seen that the addition of kaolin to a vitreous enamel resistance material in which the electrically conductive particles are tungsten carbide and tungsten makes the temperature coefficient of resistance of the resistor less negative, and, in the composition shown, the temperature coefficient of resistance became positive. Compositions 3 and 4 shown in Table I both comprise a mixture of a barium, titanium, aluminum, borosilicate glass frit, tantalum nitride and tantalum with composition 3 containing no kaolin and composition 4 containing 5% kaolin. It can be seen that the addition of kaolin to this composition of a vitreous enamel resistance material makes the temperature coefficient of resistance of the resistors made therefrom less positive. Thus, from FIGURE 1 of the drawing and Table I, it can be seen that the addition of kaolin to a vitreous enamel resistance material having a positive temperature coefficient of resistance makes the T.C. less positive and the addition of kaolin to a vitreous enamel resistance material having a negative T.C. makes the T.C. less negative.

The preparation of glass frits is well known and consists, for example, in melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The coarse frit is preferably milled in a ball mill with water to reduce the particle size of the frit and to obtain a frit of substantially uniform size.

To make the resistance material of the present invention, the glass frit, the electrically conductive particles, and the kaolin are broken down, such as by ball milling, to a particle size of preferably below 2 microns average size. The glass frit, electrically conductive particles, and kaolin are thoroughly mixed together, such as by ball milling in water or an organic medium, such as butyl Carbitol acetate or a mixture of butyl Carbitol acetate and toluol. The mixture is then adjusted to the proper viscosity for the desired manner of applying the resistance material to a ceramic body by either adding or removing the liquid medium of the material.

To make a resistor with the resistance material of the present invention, the resistance material is applied in a uniform thickness on the surface of the ceramic body. The resistance material may be coated on the ceramic body by brushing, dipping, spraying or screen stencil application.

TABLE I

| | Glass frit (percent) | Kaolin (percent) | Tungsten carbide (percent) | Tungsten (percent) | Tantalum nitride (percent) | Tantalum (percent) | Resist. (ohms) | T. C. of resisiors, percent per °C. |
|---|---|---|---|---|---|---|---|---|
| 1 | 55 | 0 | 36 | 9 | | | 445 | −.0074 |
| 2 | 50 | 5 | 36 | 9 | | | 540 | +.0021 |
| 3 | 49 | 0 | | | 34 | 17 | 1,800 | +.0370 |
| 4 | 45 | 5 | | | 34 | 17 | 200 | +.0015 |

Table I shows the typical change in the temperature coefficient of resistance achieved by the addition of kaolin to vitreous enamel resistance materials of other specific compositions. For each of the compositions shown in Table I, the amount of each of the constituents in the composition is in percent by weight. Compositions 1 and 2 shown in Table I both comprise a mixture of a barium, calcium borosilicate glass frit, tungsten carbide and tungsten with composition 1 containing no kaolin and composition 2 containing 5% kaolin. The vitreous enamel resistors formed with composition 1 had a negative temperature coefficient of resistance, whereas the resistors formed with composition 2 had a small positive tempera- The ceramic body and resistance material coating is then fired in a conventional furnace at a temperature at which the glass frit is molten. When the ceramic body and resistance material is cooled, the vitreous enamel hardens to bond the resistance material to the ceramic body.

The following examples are given to illustrate certain preferred details of the invention, it being understood that the details of the examples are not to be taken as in any way limiting the invention thereto.

EXAMPLE I

A resistor composition was prepared by blending a mixture of 40% by weight of a lead borosilicate frit, 55% by weight of a mixture of palladium and silver particles, and 5% by weight kaolin. The metals were present in the ratio of 56% of the metal content being palladium and 44% being silver. The mixture was then blended together with a squeegee medium manufactured by L. Reusche and Company, Newark, N.J., on a three-roll mill.

The resulting composition was screen stenciled on ceramic plates, and fired in a tunnel kiln at 825° C. with a 30 minute cycle. The resulting resistor had a resistance value of 100 ohms per square, and an average temperature coefficient of resistance of +0.0048% when heated from 25° C. to 150° C., and +0.004% when cooled from 25° C. to −55° C.

EXAMPLE II

A resistance composition was prepared similar to that of Example I, except that the composition contained 35% by weight of the palladium-silver mixture. Resistors were formed from this composition in the same manner as described in Example I. The resulting resistors had a resistance value of 5K ohms per square, and an average temperature coefficient of resistance of ±0.0064% when heated from 25° C. to 150° C., and ±0.0077% when cooled from 25° C. to −55° C.

EXAMPLE III

A resistance composition was prepared similar to that of Example I, except that the composition contained 30% by weight of the palladium-silver mixture. Resistors were formed from this composition in the same manner as described in Example I. The resulting resistors had a resistance value of 15K ohms per square, and an average temperature coefficient of resistance of ±0.0048% when heated from 25° C. to 150° C., and −0.0091% when cooled from 25° C. to −55° C.

EXAMPLE IV

A resistor composition was prepared by blending a mixture of 52% by weight of a barium, calcium, borosilicate glass frit, 35% by weight of a mixture of tungsten carbide and tungsten particles, and 13% by weight kaolin. The electrically conductive particles were present in the ratio of 4 parts of tungsten carbide to 1 part tungsten. The mixture was blended with butyl Carbitol acetate in a ball mill.

The resulting composition was formed into resistors on steatite rods .350 inch long and .093 inch in diameter by dip coating, and firing in a nitrogen atmosphere furnace at 960° C. for a thirty-minute cycle. The resulting resistors had a resistance value of 2800 ohms and an average coefficient of resistance of +.0064% per degree C. when heated from +25° C. to +105° C., and ±.0037% per degree C. when cooled from +25° C. to −55° C.

EXAMPLE V

A resistor composition was prepared similar to that of Example IV except that the composition contained 32% by weight of the glass frit, 55% by weight of the mixture of tungsten carbide and tungsten, and 13% by weight kaolin. Resistors were formed from this composition as described in Example IV, except that the resistors were fired at a temperature of 990° C. for a twenty-five minute cycle. The resulting resistors had a resistance value of 890 ohms, and an average temperature coefficient of resistance of +.0061% per degree C. when heated from +25° C. to +105° C., and ±.0010% per degree C. when coated from +25° C. to −55° C.

EXAMPLE VI

A resistor composition was prepared by blending a mixture of 38% by weight of a barium, titanium, aluminum, borosilicate glass frit, 57% by weight of a mixture of tantalum nitride and tantalum particles, and 5% by weight kaolin. The electrically conductive particles were present in the ratio of 2 parts tantalum nitride to 1 part tantalum. The mixture was blended with butyl Carbitol acetate in a ball mill.

Resistors were formed from this composition as described in Example IV except that the resistors were fired at a temperature of 1100° C. The resulting resistors had a resistance value of 110 ohms and a temperature coefficient of −.0045% per degree C. when heated from +25° C. to +105° C.

EXAMPLE VII

A resistor composition was prepared similar to that of Example VI except that the composition contained 27% by weight of the glass frit, 69% by weight of the tantalum nitride and tantalum mixture, and 5% by weight of kaolin. Resistors were formed from this composition as described in Example VI. The resulting resistors had a resistance value of 45 ohms and a temperature coefficient of −.0110% per degree C. when heated from +25° C. to +105° C.

The present invention may be embodied in other specific forms without departing from the spirit or essential attributes thereof, and, accordingly, reference should be made to the appending claims, rather than to the foregoing specifications as indicating the scope of the invention.

We claim:

1. A vitreous enamel resistor composition adapted to be applied to and fired on a ceramic body to form electrical resistors having a low temperature coefficient of resistance consisting essentially of a mixture of a glass frit, finely divided particles of an electrically conductive material selected from the group of mixtures consisting of a mixture of palladium and silver, a mixture of tungsten carbide and tungsten, and a mixture of a refractory metal nitride selected from the group consisting of titanium nitride, zirconium nitride, hafnium nitride, vanadium nitride, niobium nitride, tantalum nitride, chromium nitride, molybdenum nitride and tungsten nitride and a refractory metal selected from the group consisting of titanium, zirconium, hafnium, vanadium, niobium, tantalum, chromium, molybdenum and tungsten, and from 2% to 15% by weight of the total composition kaolin, said kaolin reducing the temperature coefficient of resistance of the resistor composition.

2. A vitreous enamel resistor composition in accordance with claim 1 in which the electrically conductive material is a mixture of palladium and silver in the amount of 30% to 50% by weight of the total composition.

3. A vitreous enamel resistor composition in accordance with claim 2 in which 56% of the total content of the metal particles is palladium and 44% is silver.

4. A vitreous enamel resistor composition in accordance with claim 1 in which the electrically conductive material is a mixture of tungsten carbide and tungsten in the amount of 25% to 90% by weight of the total composition.

5. A vitreous enamel resistor composition in accordance with claim 1 in which the electrically conductive material is a mixture of refractory metal nitride selected from the group consisting of titanium nitride, zirconium nitride, hafnium nitride, vanadium nitride, niobium nitride, tantalum nitride, chromium nitride, molybdenum nitride and tungsten nitride and a refractory metal selected from the group consisting of titanium, zirconium, hafnium, vanadium, niobium, tantalum, chromium, molybdenum and tungsten in the amount of 5% to 50% by volume.

6. An electrical resistor having a low temperature coefficient of resistance comprising a ceramic body containing on the surface thereof a coating of a vitreous enamel resistor composition consisting essentially of finely divided particles of an electrically conductive material selected from the group of mixtures consisting of a mixture of palladium and silver, a mixture of tungsten carbide and tungsten, and a mixture of a refractory metal nitride selected from the group consisting of titanium nitride, zirconium nitride, hafnium nitride, vanadium nitride, niobium nitride, tantalum nitride, chromium nitride, molybdenum nitride and tungsten nitride and a refractory metal selected from the group consisting of titanium, zirconium, hafnium, vanadium, niobium, tantalum chromium, molybdenum and tungsten and 2% to 15% by weight of the total composition of kaolin embedded in a glass matrix, said kaolin reducing the temperature coefficient of resistance of the resistor.

7. An electrical resistor in accordance with claim 6 in which the electrically conductive material is a mixture of palladium and silver in the amount of 30% to 55% by weight of the total composition.

8. An electrical resistor in accordance with claim 6 in which the electrically conductive material is a mixture of tungsten carbide and tungsten in the amount of 25% to 90% by weight of the total composition.

9. An electrical resistor in accordance with claim 6 in which the electrically conductive material is a mixture of a refractory metal nitride selected from the group consisting of titanium nitride, zirconium nitride, hafnium nitride, vanadium nitride, niobium nitride, tantalum nitride, chromium nitride, molybdenum nitride and tungsten nitride and a refractory metal selected from the group consisting of titanium, zirconium, hafnium, vanadium, niobium, tantalum, chromium, molybdenum and tungsten in the amount of 5% to 50% by volume.

References Cited
UNITED STATES PATENTS

| | | | |
|---|---|---|---|
| 2,060,393 | 11/1936 | Heyroth | 252—518 X |
| 2,786,819 | 3/1957 | Smith et al. | 252—519 |
| 2,845,515 | 7/1958 | Anderson et al. | 252—512 |
| 2,924,540 | 2/1960 | D'Andrea | 252—514 X |
| 3,046,328 | 7/1962 | Schurecht | 252—512 X |

LEON D. ROSDOL, *Primary Examiner.*

J. D. WELSH, *Assistant Examiner.*

U.S. Cl. X.R.

106—49; 117—227; 252—514, 515, 518, 521